US010401202B2

(12) United States Patent
Monkowski et al.

(10) Patent No.: US 10,401,202 B2
(45) Date of Patent: Sep. 3, 2019

(54) METHOD AND APPARATUS FOR GAS FLOW CONTROL

(71) Applicant: Pivotal Systems Corporation, Fremont, CA (US)

(72) Inventors: Joseph R. Monkowski, Danville, CA (US); James Franklin, San Francisco, CA (US); Jiuyi Cheng, Milpitas, CA (US); Tao Ding, San Leandro, CA (US); Andrey Shmakov, San Francisco, CA (US); Travis Owens, Fremont, CA (US)

(73) Assignee: PIVOTAL SYSTEMS CORPORATION, Fremont, CA (US)

( * ) Notice: Subject to any disclaimer, the term of this patent is extended or adjusted under 35 U.S.C. 154(b) by 335 days.

(21) Appl. No.: 15/206,180

(22) Filed: Jul. 8, 2016

(65) Prior Publication Data
US 2017/0010625 A1  Jan. 12, 2017

Related U.S. Application Data

(60) Provisional application No. 62/191,272, filed on Jul. 10, 2015.

(51) Int. Cl.
F16K 31/02 (2006.01)
G01F 1/34 (2006.01)
G05D 7/06 (2006.01)

(52) U.S. Cl.
CPC ............ G01F 1/34 (2013.01); G05D 7/0635 (2013.01)

(58) Field of Classification Search
CPC ................. G01F 1/34; G05D 7/0635

USPC ..................................... 137/487.5
See application file for complete search history.

(56) References Cited

U.S. PATENT DOCUMENTS 4,114,419 A   9/1978  Kimbell
4,285,245 A   8/1981  Kennedy
4,560,871 A  12/1985  Bowman et al.
4,617,952 A  10/1986  Fujiwara et al.
(Continued)

FOREIGN PATENT DOCUMENTS

CN    1839358 A    9/2006
CN  101115919 A    1/2008
(Continued)

OTHER PUBLICATIONS

"Fundamentals of Mass Flow Control: Critical Terminology and Operation Principles for Gas and Liquid MFC's", Advanced Energy, White Paper, Advanced Energy Industries, Inc., 2005, 5 pages.
(Continued)

Primary Examiner — Minh Q Le
(74) Attorney, Agent, or Firm — Womble Bond Dickinson (US) LLP; Joseph Bach, Esq.

(57) ABSTRACT

An apparatus for controlling the flow of a gas, containing a controllable valve, wherein the position of the valve and the gas pressure upstream of the valve are measured and used in conjunction with a first lookup table to determine the flow rate of the gas through the valve; and a flow restrictor upstream of the controllable valve, wherein the temperature of the flow restrictor and the gas pressure upstream and downstream of the flow restrictor are measured and used in conjunction with a second lookup table to determine the flow rate of the gas through the flow restrictor.

9 Claims, 8 Drawing Sheets

(56) References Cited

U.S. PATENT DOCUMENTS

| | | | |
|---|---|---|---|
| 4,695,034 A | 9/1987 | Shimizu et al. | |
| 5,062,446 A | 11/1991 | Anderson | |
| 5,092,360 A | 3/1992 | Watanabe et al. | |
| 5,094,430 A | 3/1992 | Shirai et al. | |
| 5,142,781 A | 9/1992 | Mettner et al. | |
| 5,145,147 A | 9/1992 | Nakazawa et al. | |
| 5,146,941 A * | 9/1992 | Statler | G05D 7/0635 137/468 |
| 5,154,206 A | 10/1992 | Gillott et al. | |
| 5,161,774 A | 11/1992 | Engelsdorf et al. | |
| 5,224,843 A | 7/1993 | van Lintel | |
| 5,238,223 A | 8/1993 | Mettner et al. | |
| 5,388,984 A | 2/1995 | Meslif | |
| 5,497,804 A | 3/1996 | Codina et al. | |
| 5,532,922 A * | 7/1996 | Wacker | G05B 13/0265 700/282 |
| 5,566,710 A | 10/1996 | Dahlgren et al. | |
| 5,593,134 A | 1/1997 | Steber et al. | |
| 5,624,409 A | 4/1997 | Seale | |
| 5,647,574 A | 7/1997 | Mettner et al. | |
| 5,684,245 A | 11/1997 | Hinkle | |
| 5,730,861 A | 3/1998 | Sterghos et al. | |
| 5,785,087 A | 7/1998 | Takahashi et al. | |
| 5,787,915 A | 8/1998 | Byers et al. | |
| 5,839,467 A | 11/1998 | Saaski et al. | |
| 5,856,743 A | 1/1999 | Juniman | |
| 5,868,159 A | 2/1999 | Loan et al. | |
| 5,925,829 A | 7/1999 | Laragione et al. | |
| 5,926,955 A | 7/1999 | Kober | |
| 5,942,892 A | 8/1999 | Li | |
| 5,997,280 A | 12/1999 | Welz, Jr. et al. | |
| 6,062,256 A | 5/2000 | Miller et al. | |
| 6,113,695 A | 9/2000 | Fujimoto | |
| 6,138,708 A | 10/2000 | Waldbusser | |
| 6,142,444 A | 11/2000 | Kluge | |
| 6,182,941 B1 | 2/2001 | Scheurenbrand et al. | |
| 6,216,726 B1 | 4/2001 | Brown et al. | |
| 6,230,731 B1 | 5/2001 | Miller et al. | |
| 6,230,738 B1 | 5/2001 | Watanabe et al. | |
| 6,240,962 B1 | 6/2001 | Tai et al. | |
| 6,244,296 B1 | 6/2001 | Lafler et al. | |
| 6,247,493 B1 | 6/2001 | Henderson | |
| 6,267,146 B1 | 7/2001 | Miyazoe et al. | |
| 6,276,385 B1 | 8/2001 | Gassman | |
| 6,321,781 B1 | 11/2001 | Kurth | |
| 6,363,958 B1 | 4/2002 | Ollivier | |
| 6,382,226 B1 | 5/2002 | Larson et al. | |
| 6,412,444 B1 | 7/2002 | Esham | |
| 6,450,200 B1 | 9/2002 | Ollivier | |
| 6,460,567 B1 | 10/2002 | Hansen, III et al. | |
| 6,519,508 B1 | 2/2003 | Saito | |
| 6,520,479 B1 | 2/2003 | Sato | |
| 6,539,968 B1 * | 4/2003 | White | G05D 7/0635 137/10 |
| 6,581,623 B1 | 6/2003 | Carpenter et al. | |
| 6,627,465 B2 | 9/2003 | Sandhu et al. | |
| 6,648,019 B2 | 11/2003 | Gagnon | |
| 6,761,063 B2 | 7/2004 | Mengle | |
| 6,782,906 B2 | 8/2004 | Chang | |
| 6,811,136 B2 | 11/2004 | Eberhardt et al. | |
| 6,948,508 B2 | 9/2005 | Shajii et al. | |
| 6,964,279 B2 * | 11/2005 | Ohmi | G05D 7/0635 137/486 |
| 6,968,859 B1 | 11/2005 | Nagano et al. | |
| 7,089,134 B2 | 8/2006 | Barros et al. | |
| 7,136,767 B2 | 11/2006 | Shajii et al. | |
| 7,204,158 B2 | 4/2007 | Morgan et al. | |
| 7,283,894 B2 | 10/2007 | Esposito et al. | |
| 7,412,986 B2 | 8/2008 | Tison et al. | |
| 7,569,049 B1 | 8/2009 | Blischak | |
| 7,809,473 B2 | 10/2010 | Shajii et al. | |
| 7,823,436 B2 | 11/2010 | Monkowski et al. | |
| 7,875,398 B2 | 1/2011 | Kokubo | |
| 7,882,852 B2 | 2/2011 | Coakley et al. | |
| 7,918,238 B2 | 4/2011 | Tanaka et al. | |
| 7,992,395 B2 | 8/2011 | Zhang et al. | |
| 8,219,329 B2 * | 7/2012 | Ebi | G01F 1/48 702/100 |
| 8,240,324 B2 | 8/2012 | Monkowski et al. | |
| 8,265,888 B2 | 9/2012 | Chung et al. | |
| 8,271,210 B2 | 9/2012 | Chung et al. | |
| 8,271,211 B2 * | 9/2012 | Chung | G01F 1/34 137/2 |
| 8,667,830 B2 | 3/2014 | Monkowski et al. | |
| 8,757,197 B2 | 6/2014 | Hirata et al. | |
| 8,857,456 B2 | 10/2014 | Monkowski et al. | |
| 8,910,656 B2 * | 12/2014 | Yasuda | G05D 7/0106 137/377 |
| 9,075,414 B2 * | 7/2015 | Takijiri | G05D 7/0617 |
| 9,400,004 B2 * | 7/2016 | Monkowski | F15D 1/025 |
| 9,417,108 B2 * | 8/2016 | Ito | G01F 1/78 |
| 9,454,158 B2 * | 9/2016 | Somani | G01F 15/003 |
| 9,488,516 B2 * | 11/2016 | Smirnov | G05D 7/0635 |
| 9,665,105 B2 * | 5/2017 | Someya | G05D 7/0635 |
| 2001/0038083 A1 | 11/2001 | Sakurai | |
| 2002/0108652 A1 | 8/2002 | Palmer | |
| 2003/0010948 A1 | 1/2003 | Horiuchi et al. | |
| 2003/0159735 A1 | 8/2003 | Barillot et al. | |
| 2003/0172975 A1 | 9/2003 | Gilbert et al. | |
| 2005/0199301 A1 | 9/2005 | Frisch | |
| 2005/0221147 A1 | 10/2005 | Shioya et al. | |
| 2006/0006484 A1 | 1/2006 | Seneviratne et al. | |
| 2006/0278276 A1 | 12/2006 | Tanaka et al. | |
| 2007/0044851 A1 | 3/2007 | Gilbert et al. | |
| 2007/0241296 A1 | 10/2007 | Prieto Barranco et al. | |
| 2008/0173010 A1 | 7/2008 | Suresh et al. | |
| 2009/0183548 A1 * | 7/2009 | Monkowski | G01F 25/0038 73/1.35 |
| 2009/0266139 A1 | 10/2009 | Gregor et al. | |
| 2010/0080262 A1 * | 4/2010 | McDonald | G01F 1/684 374/166 |
| 2010/0243076 A1 | 9/2010 | Hayashi | |
| 2011/0015791 A1 * | 1/2011 | Smirnov | G01F 1/696 700/282 |
| 2011/0108126 A1 | 5/2011 | Monkowski et al. | |
| 2011/0320162 A1 | 12/2011 | Kah | |
| 2012/0204979 A1 | 8/2012 | Pan | |
| 2014/0069527 A1 * | 3/2014 | Mudd | G05D 7/0635 137/487 |
| 2014/0190579 A1 * | 7/2014 | Ding | G01F 25/003 137/487 |
| 2014/0366952 A1 | 12/2014 | Monkowski et al. | |
| 2014/0367596 A1 | 12/2014 | Monkowski et al. | |
| 2016/0372348 A1 * | 12/2016 | Sawachi | H01J 37/32009 |
| 2017/0060143 A1 * | 3/2017 | Ding | G01F 15/005 |

FOREIGN PATENT DOCUMENTS

| | | |
|---|---|---|
| CN | 102687087 A | 9/2012 |
| CN | 101978132 B | 4/2015 |
| CN | 104615157 A | 5/2015 |
| DE | 10314386 A1 | 10/2004 |
| EP | 2247819 A1 | 11/2010 |
| EP | 2488925 A1 | 8/2012 |
| JP | 60-62118 A | 4/1985 |
| JP | 62-141381 A | 6/1987 |
| JP | 2-163580 A | 6/1990 |
| JP | 11-223538 A | 8/1999 |
| JP | 2000-507681 A | 6/2000 |
| JP | 2001-502248 A | 2/2001 |
| JP | 2002-099330 A | 4/2002 |
| JP | 2002-200597 A | 7/2002 |
| JP | 2002-205022 A | 7/2002 |
| JP | 2003-028317 A | 1/2003 |
| JP | 2003-529218 A | 9/2003 |
| JP | 2006-038832 A | 2/2006 |
| JP | 2008-089607 A | 4/2008 |
| JP | 2009-294820 A | 12/2009 |
| JP | 2011-510404 A | 3/2011 |
| JP | 2013-508825 A | 3/2013 |
| JP | 5654099 B2 | 11/2014 |
| JP | 2015-064893 A | 4/2015 |
| KR | 10-2010-0114079 A | 10/2010 |

(56) References Cited

FOREIGN PATENT DOCUMENTS

| KR | 10-2012-0095362 A | 8/2012 |
|---|---|---|
| TW | I399627 B1 | 6/2013 |
| TW | I435196 B | 4/2014 |
| WO | 2006/014508 A2 | 2/2006 |
| WO | 2008/129783 A1 | 10/2008 |
| WO | 2009091935 A1 | 7/2009 |
| WO | 2011047361 A1 | 4/2011 |

OTHER PUBLICATIONS

Decision of Grant for Japanese Patent Application No. 2013-156603 dated Oct. 21, 2014.
Decision of Grant for Japanese Patent Application No. 2014-234087 dated Jun. 14, 2016.
Decision of Refusal for Japanese Patent Application No. 2012-534432 dated Apr. 12, 2016.
Decision of Refusal in Japanese Patent Application No. 2012-534432 dated Apr. 7, 2015.
Decision of Rejection for Japanese Patent Application No. 2010-543262 dated Oct. 1, 2013.
Examination Report in European Patent Application No. 10 779 088.3 dated Oct. 30, 2013.
Examination Report in Taiwanese Patent Application No. 98101722 dated Dec. 6, 2012.
Examination Report in Taiwanese Patent Application No. 99135139 dated Jun. 26, 2013.
First Office Action in Chinese Patent Application No. 200980109390.3 dated Dec. 17, 2012.
Fourth Office Action in Chinese Patent Application No. 2009801093903 dated Nov. 13, 2014.
International Preliminary Report on Patentability in International Application No. PCT/US2009/031170 dated Jul. 29, 2010.
International Preliminary Report on Patentability in International Application No. PCT/US2010/052974 dated Apr. 26, 2012.
International Search Report and Written Opinion in International Application No. PCT/US2009/031170 dated Mar. 23, 2009.
International Search Report and Written Opinion in International Application No. PCT/US2010/052974 dated Mar. 11, 2011.
Invitation to Pay Additional Fees in International Application No. PCT/US2010/052974 dated Dec. 28, 2010.
Notice of Allowance in Taiwanese Patent Application No. 98101722 dated May 13, 2013.
Notice of Allowance in Taiwanese Patent Application No. 99135139 dated Mar. 5, 2014.
Notice of Refusal in Japanese Patent Application No. 2010-543262 dated Jan. 29, 2013.
Notice of Refusal in Japanese Patent Application No. 2012-534432 dated Jul. 15, 2014.
Notice of Refusal in Japanese Patent Application No. 2013-156603 dated Apr. 15, 2014.
Notice of Rejection for Korean Patent Application No. 10-2012-7009624 dated Jun. 30, 2016.
Notification of the Division in Chinese Patent Application No. 201080046178.X dated Dec. 1, 2014.
Office Action for Chinese Patent Application No. 201080046178.X dated Jan. 8, 2016.
Office Action for Chinese Patent Application No. 201080046178.X dated Jun. 17, 2015.
Office Action for Japanese Patent Application No. 2014-234087 dated Dec. 8, 2015.
Office Action for Korean Patent Application No. 2010-7018060 dated Jun. 23, 2015.
Office Action for Korean Patent Application No. 2010-7018060 dated Oct. 7, 2015.
Office Action in Chinese Patent Application No. 201080046178.X dated Mar. 4, 2014.
Office Action in Korean Patent Application No. 2010-7018060 dated Feb. 5, 2015.
Second Office Action in Chinese Patent Application No. 200980109390.3 dated Sep. 29, 2013.
Third Office Action in Chinese Patent Application No. 200980109390.3 dated May 16, 2014.
Written Report of Re-Examination for Korean Patent Application No. 2010-7018060 dated Feb. 19, 2016.
Advisory Action in U.S. Appl. No. 12/906,058 dated Feb. 20, 2014.
Notice of Allowance for U.S. Appl. No. 13/306,940 dated Mar. 23, 2016.
Notice of Allowance for U.S. Appl. No. 14/475,494 dated Aug. 2, 2016.
Notice of Allowance in U.S. Appl. No. 12/354,723 dated Jun. 29, 2010.
Notice of Allowance in U.S. Appl. No. 12/355,654 dated Apr. 17, 2012.
Notice of Allowance in U.S. Appl. No. 12/634,568 dated May 29, 2012.
Notice of Allowance in U.S. Appl. No. 12/634,593 dated May 18, 2012.
Notice of Allowance in U.S. Appl. No. 12/634,629 dated May 11, 2012.
Notice of Allowance in U.S. Appl. No. 12/891,714 dated Jun. 26, 2013.
Notice of Allowance in U.S. Appl. No. 12/891,714 dated Nov. 7, 2013.
Notice of Allowance in U.S. Appl. No. 13/584,736 dated May 29, 2014.
Office Action for U.S. Appl. No. 13/306,940 dated Aug. 27, 2015.
Office Action for U.S. Appl. No. 14/475,494 dated Jan. 22, 2016.
Office Action in U.S. Appl. No. 12/354,723 dated Apr. 21, 2010.
Office Action in U.S. Appl. No. 12/355,654 dated Jan. 20, 2012.
Office Action in U.S. Appl. No. 12/634,568 dated Mar. 9, 2012.
Office Action in U.S. Appl. No. 12/634,593 dated Mar. 12, 2012.
Office Action in U.S. Appl. No. 12/634,629 dated Mar. 12, 2012.
Office Action in U.S. Appl. No. 12/891,714 dated Nov. 15, 2012.
Office Action in U.S. Appl. No. 12/906,058 dated Jan. 22, 2013.
Office Action in U.S. Appl. No. 12/906,058 dated Sep. 9, 2013.
Office Action in U.S. Appl. No. 13/306,940 dated Jan. 7, 2015.
Office Action in U.S. Appl. No. 13/584,736 dated Nov. 20, 2013.
Office Action in U.S. Appl. No. 14/475,472 dated Jan. 22, 2016.
Restriction Requirement in U.S. Appl. No. 12/354,723 dated Mar. 10, 2010.
Restriction Requirement in U.S. Appl. No. 12/355,654 dated Aug. 3, 2011.
Restriction Requirement in U.S. Appl. No. 12/891,714 dated Oct. 12, 2012.
Restriction Requirement in U.S. Appl. No. 14/475,494 dated Oct. 27, 2015.

\* cited by examiner

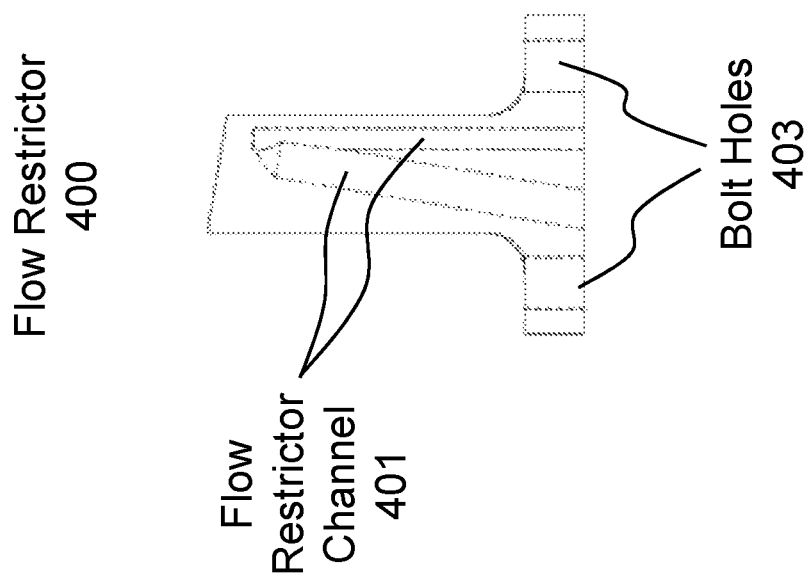
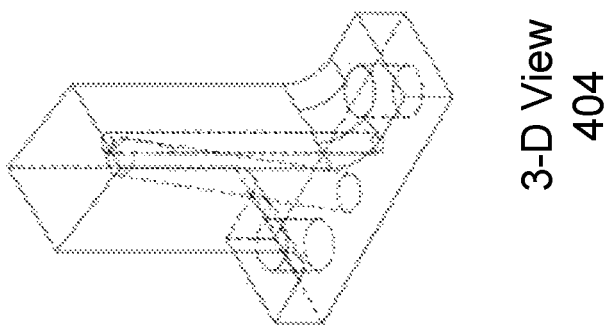
Figure 4A
Figure 4B

METHOD AND APPARATUS FOR GAS FLOW CONTROL

RELATED APPLICATION

This application claims priority benefit from U.S. Provisional Application, Ser. No. 62/191,272, filed on Jul. 10, 2015, the content of which is incorporated herein in its entirety.

BACKGROUND

1. Field

This Application relates to control of gas flow, especially when accurate measurement is needed, such as in semiconductor processing.

2. Related Art

Metering the flow rate of a gas is important to many industrial processes. In the case of the semiconductor industry, metering must be especially accurate, because deviations in the flow rate of only several percent can lead to process failures.

The industry-standard flow control device is a mass flow controller (MFC), containing a valve that can be partially opened to allow increased flow or partially closed to decrease flow. The opening of the valve is controlled by a closed loop feedback circuit that minimizes the difference between an externally provided setpoint (i.e., the desired flow rate) and the reading from an internal flow measuring device. The flow measuring device uses a thermal sensor with two resistance-thermometer elements wound around the outside of a tube through which the gas flows. The elements are heated by applying an electric current. As the gas flows through the tube, it picks up heat from the first element and transfers it to the second element. The resulting temperature differential between the two elements is a measure of the mass flow rate of the gas. In the newer, pressure insensitive MFCs, a pressure transducer is included between the thermal sensor and the control valve to account for the effects of changing pressure on flow.

A consequence of the thermal sensor flow measurement used in the MFC is that accurate flow control requires regular calibration of the device. Without regular calibration, the actual flow rate through the MFC can drift to unacceptable values due to drift in the flow measuring device. This calibration is often performed by flowing gas through the MFC into or out of a known volume and measuring the pressure rise or drop in the volume. The actual flow rate can be determined by calculating the rate of pressure rise or drop and using established pressure-temperature-volume gas relations. This type of measurement is known as a rate-of-rise calibration.

Another method of metering the flow rate of a gas is to vary the pressure of the gas upstream of a critical orifice. The volume-flow rate of a gas through a critical orifice at constant temperature is independent of the upstream or downstream pressure, provided that certain pressure requirements are met, e.g., the upstream pressure is at least twice that of the downstream pressure. By controlling the density of the upstream gas, which is proportional to pressure, the mass-flow rate through the critical orifice can be controlled.

In this type of flow control, the pressure is controlled using a control valve in a closed loop control circuit with a pressure transducer positioned between the control valve and the critical orifice. The control valve is opened or closed to maintain a specified pressure upstream of the critical orifice. Mass flow rate is determined from the pressure upstream of a critical orifice and the established characteristics of the critical orifice. Accurate flow metering, therefore, is dependent not only on the performance of the pressure controlling system, but also on the mechanical integrity and stability of the dimensions of the orifice. Since the orifice is susceptible to being restricted with particulate contamination or eroded with reaction by the gases flowing through it, it is desirable to calibrate the pressure-flow relationship on a regular basis. This is performed using the same rate-of-rise measurement that is used for the MFC.

In both of these flow controllers, any drift in the flow will not be discovered until the flow controller undergoes calibration; consequently, there is always the possibility that critical processes are being severely compromised by inaccurate gas flow.

The shortcomings of both of these flow control schemes, especially the need for external measurements for calibration and detection of faults, illustrate why an improved flow control scheme is desirable.

A key requirement of a flow control device that is able to detect faults in its operation is that there be a sufficient number of process variables that are observable and controllable. For both types of flow control devices described above, which comprise the vast majority of flow control devices used in the semiconductor industry, there are not sufficient process variables to accomplish these tasks.

SUMMARY

The following summary of the disclosure is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Disclosed embodiment provides a new flow measuring device which is capable of self monitoring for potential drift in flow measurement.

According to aspects of the invention, the traditional mass flow controller is replaced with a new gas flow controller having sufficient process variables for performing self analysis.

According to embodiments of the present invention, a sufficient number of process variables are made available by implementing two flow restrictions: (1) a control valve that is designed to provide a highly accurate and repeatable mapping between its position and its flow restriction characteristics, and is able to achieve a very accurate measurement and control of its position, and (2) a flow restrictor, for which the relationship among upstream pressure, downstream pressure, temperature, and flow is well characterized.

Embodiments of the invention provide a method of controlling a flow rate of gas through a control valve, the method comprising: generating a lookup table correlating pressure upstream of the gas flow control valve, the measured position of the valve, and flow rates; establishing a flow rate through the control valve based on the pressure upstream of the gas flow control valve and the required drive signal to obtain the determined position from the lookup table; continuing to keep the gas flow control valve at the determined position to provide the desired flow rate as the pressure changes, if it does change; determining the flow rate using a flow sensor upstream of the gas flow control valve; calculating a discrepancy between the desired flow rate from the lookup table and the flow rate determined by the flow sensor, updating the lookup table using the discrepancy and continuing to measure the pressure and adjust the gas flow control valve to achieve the desired flow rate, and sending an alarm if the discrepancy is above a predetermined value. The flow sensor may be a flow restrictor with a second lookup table that determines flow rate based on measurements of pressure upstream and downstream of the flow restrictor and the temperature of the flow restrictor. The flow restrictor may comprise a tube or a channel formed in a machined block of metal, and the method may further comprise maintaining pressure upstream of the flow restrictor to at least twice pressure downstream of the flow restrictor. The flow sensor may be a thermal sensor and the method may further comprise obtaining the flow rate from a mass flow signal of the thermal sensor.

According to further embodiments, a method of controlling a flow rate of gas through a control valve is provided, the method comprising: generating a first lookup table correlating pressure upstream of the gas flow control valve, the measured position of the valve, and flow rates; determining the flow rate of gas through a flow restrictor positioned upstream of the control valve, wherein the gas flow rate is determined by use of a second lookup table and measured values of the pressure upstream of the flow restrictor, the pressure downstream of the flow restrictor, and the temperature of the flow restrictor; determining from the first lookup table the required change in control valve position to obtain the desired flow rate; driving that change in control valve position; repeating above steps during the time that the desired flow rate is at a nonzero value.

According to other aspects, an apparatus for controlling the flow of a gas is provided, comprising a controllable valve, wherein the position of the valve and the gas pressure upstream of the valve are measured and used in conjunction with a first lookup table to determine the flow rate of the gas through the valve; and a flow restrictor upstream of the controllable valve, wherein the temperature of the flow restrictor and the gas pressure upstream and downstream of the flow restrictor are measured and used in conjunction with a second lookup table to determine the flow rate of the gas through the flow restrictor. The comparison of the flow rate as determined from the first lookup table and the flow rate as determined from the second lookup table is used to verify the accuracy of the flow. The flow restrictor may comprise a tube or a channel formed in a machined block of metal.

BRIEF DESCRIPTION OF THE DRAWINGS

The accompanying drawings, which are incorporated in and constitute a part of this specification, exemplify the embodiments of the present invention and, together with the description, serve to explain and illustrate principles of the invention. The drawings are intended to illustrate major features of the exemplary embodiments in a diagrammatic manner. The drawings are not intended to depict every feature of actual embodiments nor relative dimensions of the depicted elements, and are not drawn to scale.

FIG. 2A shows the control valve in the closed position.

FIG. 2B shows the control valve in the open position, where the amount of opening is designated by "h".

FIGS. 4A and 4B are simplified schematic diagrams of another embodiment of a flow restrictor.

DETAILED DESCRIPTION

According to aspects of the invention, the standard mass flow controller is replaced by a new gas flow controller (GFC). Generally it should be appreciated that in the standard MFC what is measured is energy transfer (in the form of heat carried by the gas), which correlates to mass flow of the gas. Conversely, in the disclosed gas flow controller what is measured and controlled is gas flow, not mass flow. Consequently, by using the arrangement disclosed, better control of gas flow is achieved.

Figure 1:
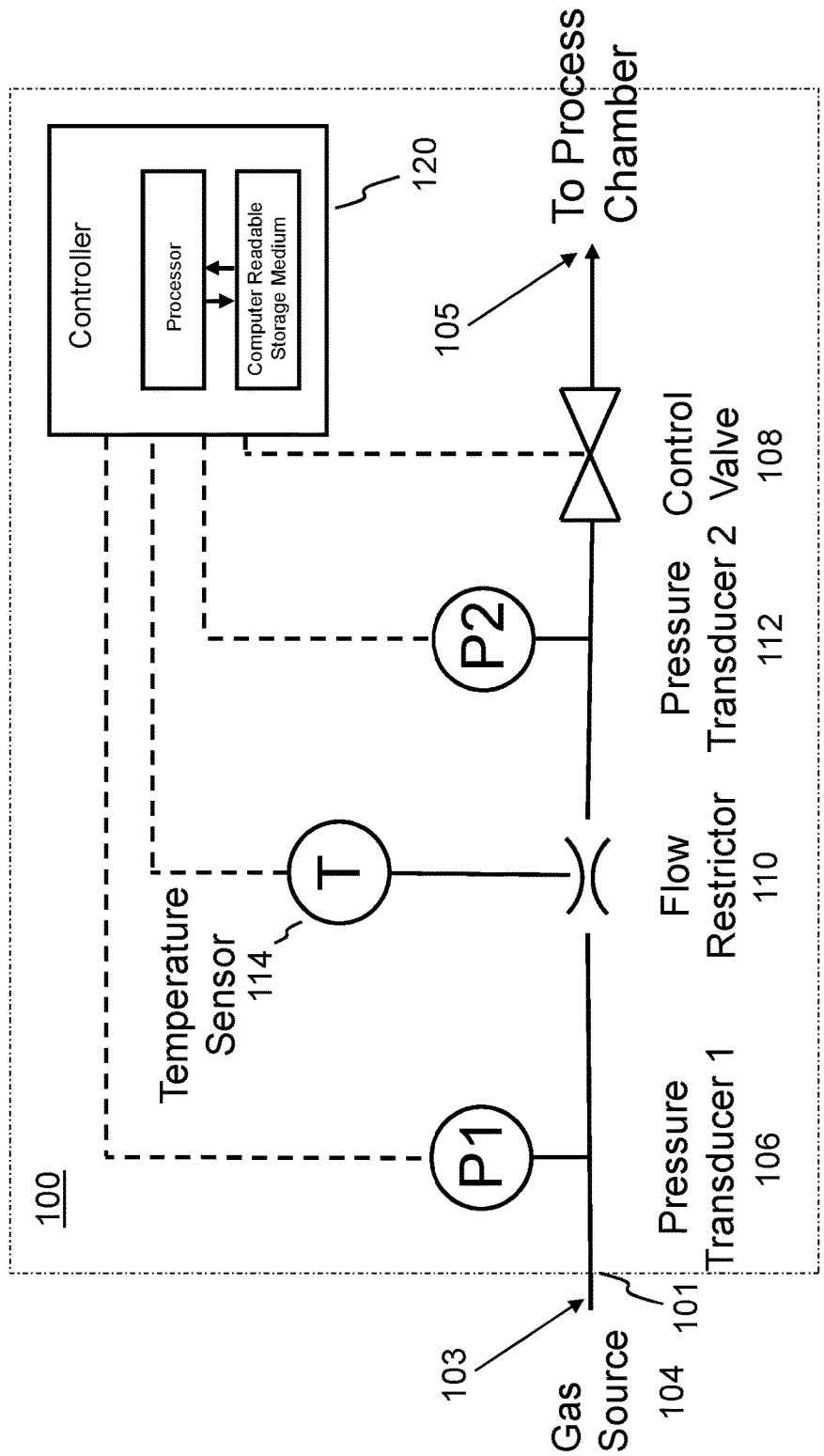
FIG. 1 is a simplified schematic diagram of an embodiment of a gas flow control apparatus in accordance with the present invention for self-verifying gas flow control.

FIG. 1 is a simplified schematic diagram of an embodiment of a gas flow control apparatus 100, in accordance with the present invention, for self-verifying gas flow control. In FIG. 1 gas source 104 provides gas flow into intake 101 of the GFC 100. A pressure transducer 106 measures the gas pressure at the intake 101. The gas is then flowed into flow restrictor 110 (explained further below with reference to FIGS. 3 and 4A and 4B). A second pressure transducer 112 is provided downstream of the flow restrictor 110.

In FIG. 1 the GFC 100 implements two successive flow restrictions: (1) a flow restrictor 110, for which the relationship among upstream pressure, downstream pressure, temperature, and flow is well characterized, followed by (2) a control valve 108 that is designed to provide a highly accurate and repeatable mapping between its position and its flow restriction characteristics, and is able to achieve a very accurate measurement and control of its position. The successive operation of these two flow restrictions enables better control of gas flow and provides sufficient parameters to enable self monitoring by the GFC.

Various embodiments of the present invention use a control valve 108 that has a controllable flow restriction in which the dimensions of the flow restriction are measurable and controllable to a very high degree of precision.

In the embodiments of the present invention, this level of precision is obtained by incorporating the following characteristics:

1. Uniaxial motion of the two opposing faces of the flow restriction, where transverse and/or rotational motion in the other two axes is limited to less than approximately 1 nm
2. Measurement of motion in the uniaxial dimension to a precision of approximately 1 nm
3. Actuation of motion with resolution of approximately 0.1 nm.

Figure 2A:
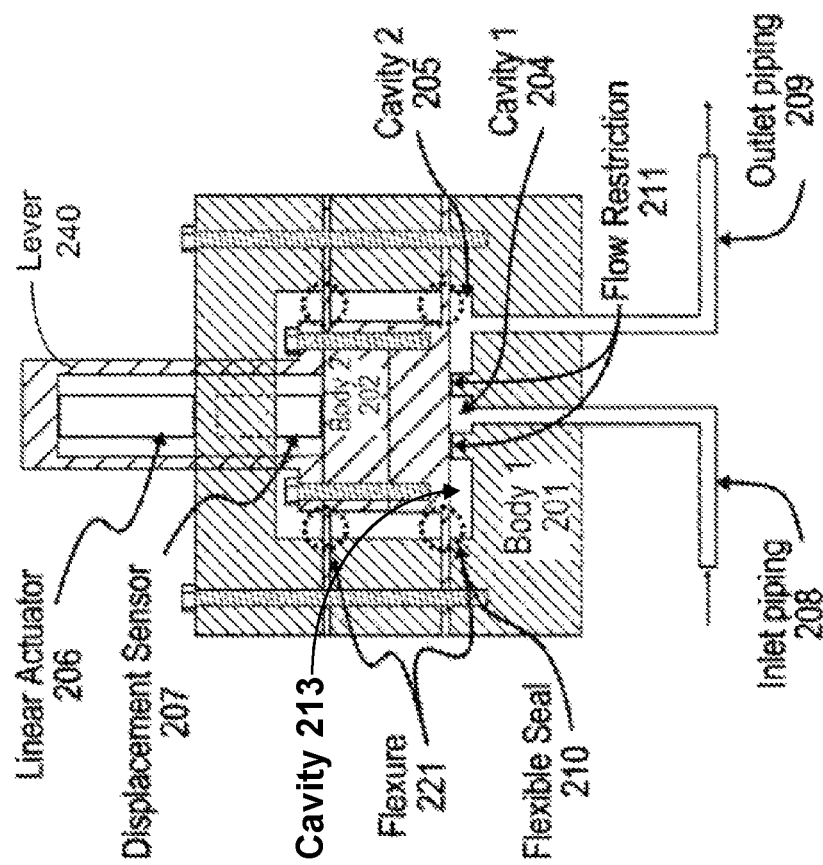
FIG. 2A is a simplified schematic diagram of an embodiment of an apparatus in accordance with the present invention for a high precision controllable flow restriction, which is used for the control valve.
Figure 2B:
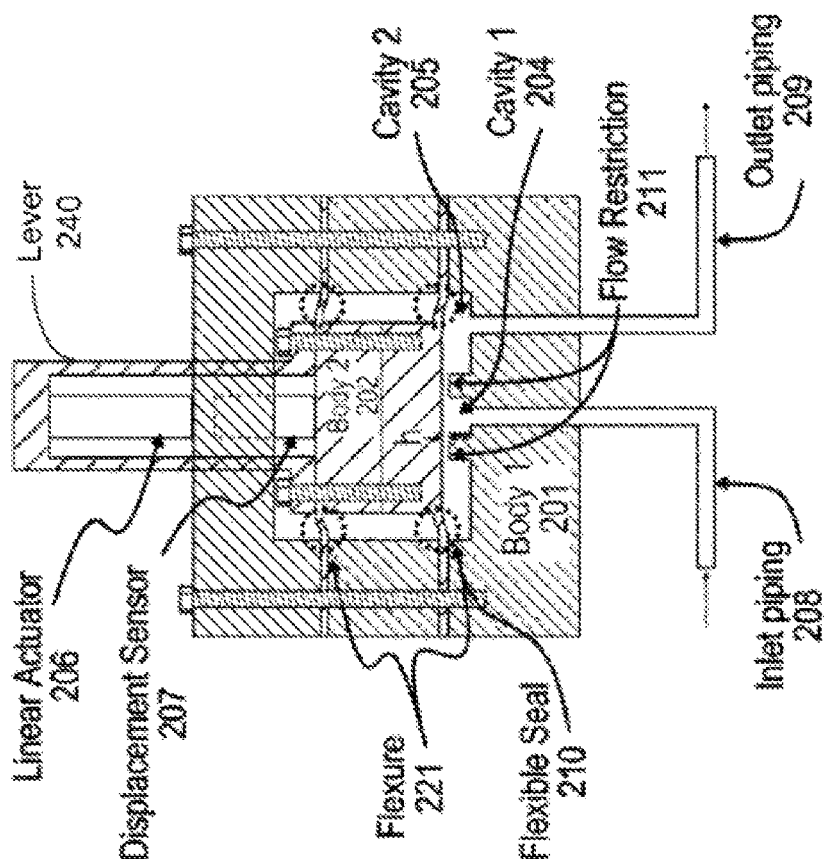
FIG. 2B is a simplified schematic diagram of an embodiment of an apparatus in accordance with the present invention for a high precision controllable flow restriction, which is used for the control valve.

An illustrative embodiment of such a control valve is shown in FIGS. 2A and 2B. In this embodiment the control valve consists of two adjacent bodies 201 and 202 with a planar contacting area that forms the flow restriction 211. FIG. 2A illustrates the closed, i.e., no flow condition, and FIG. 2B illustrates the open position. As shown, body 202 is joined to body 201 via upper and lower flexures 221. In one embodiment, body 201 and body 202 are cylindrical and the flexure parts 221 are round disks extending from body 202 and may be machined from the same block as body 202 or maybe simply attached to body 202 by, e.g., welding. While other shapes are possible, circular shapes would provide uniform and balanced movement. In this embodiment, the lower flexure part 221 also functions as the seal 210 to seal cavity 213, although it is clearly possible to provide a separate seal. Cavity 213 is confined by the lower part of body 201 the bottom surface of body 202 and the lower flexure part 221, and includes cavity 204, coupled to the inlet piping 208, and cavity 205, coupled to the outlet piping 209. When the body 202 is in its relaxed position, it hermetically separates cavities 204 and 205. When the body 202 is in its raised position, it allows controlled fluid flow between cavities 204 and 205.

Linear actuator 206 is provided between lever 240 and the top portion of body 201, such that when the actuator 206 expands, it raises the lever so as to raise body 202 and elastically flex the flexure parts of body 202, as illustrated in FIG. 2B. In the elevated position, the bottom surface of body 202, which forms the flow restriction surface, is raised a distance "h" from the complementary flow restriction surface of body 201, to thereby allow controlled fluid flow through the flow restriction valve 211 and into cavity 213, so that the gas may flow into outlet piping 209. In this embodiment the two cylindrical flexures limit relative motion between the bodies 201 and 202 to one degree of freedom (vertical), and restrict rotation of the bodies with respect to each other in the plane of the page. This enables high accurate control of the fluid flow through the flow restriction 211.

An actuator 206 is installed in the first body 201 which acts on the second body 202 to induce displacement of the second body, and therefore change the flow restriction dimension. The displacement sensor 207 is installed in the first body to measure this displacement of the second body 202 with respect to the first body. Alternatively, a displacement sensor may measure the displacement of the level 240 or the actuator 206. In one embodiment, this is accomplished using a capacitive measuring device, or displacement sensor, which can measure linear displacements on the order of one nanometer.

A closed loop control circuit is formed with the output of the sensor 207 and the action of the actuator 206 to accomplish control of the flow restriction 211 dimensions, and consequently, the flow conductance coupling the two cavities. Piping 208 and 209 is incorporated into the system such that gas flow is directed into one cavity and out of another, such that all flow must pass through the flow restriction defined by the two bodies.

Figure 3:
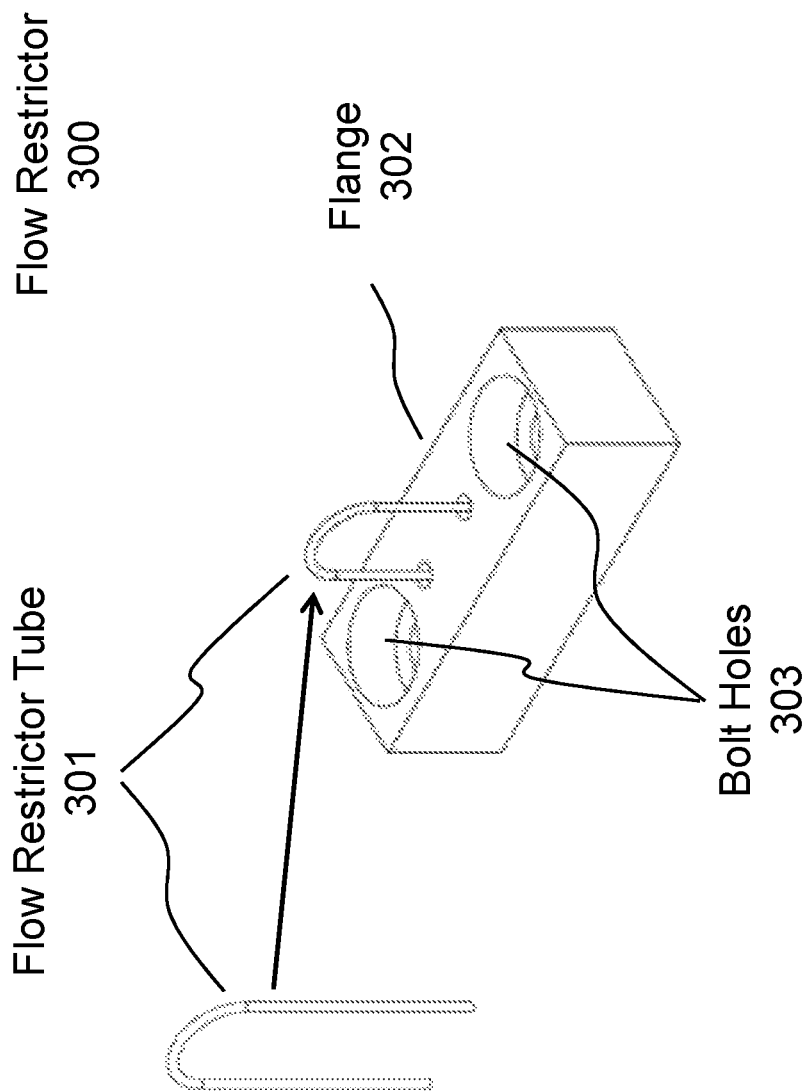
FIG. 3 is a simplified schematic diagram of an embodiment of a flow restrictor.

As shown in FIG. 1, the GFC of this embodiment also contains a flow restrictor 110. Typical embodiments of a flow restrictor are shown in FIGS. 3 and 4A-4B. In FIG. 3, a tube bent into a U-shape is used for the flow restrictor. As shown in FIG. 3, this tube 301 is welded inside of a flange 302 that is secured to the body of the flow control device (not shown) with bolts that are inserted into the bolt holes 303, connecting the gas flow path of the flow restrictor to that of the two pressure transducers 106 and 112, which are also secured to the body of the flow control device, one upstream and one downstream of the flow restrictor. In FIGS. 4A-4B, the flow restrictor channel 401 is machined into a block, and this block similarly is secured to the flow control device with bolts that are inserted into the bolt holes 403.

Prior to controlling flow, a lookup table, or some other form for recording the data (referred to generically as "lookup table"), is created to describe the relationship among the upstream pressure, the downstream pressure, the temperature, and the flow through the flow restrictor 110. Another way to capture this same information is to describe the relationship among the upstream pressure, the pressure drop across the flow restrictor, the temperature, and the flow through the flow restrictor 110. With this lookup table and pressure sensors on both ends of the flow restrictor 110 as well as a temperature sensor 114 measuring the temperature of the flow restrictor, the flow restrictor 110 can be used as a flow sensor. Since flow restrictor has no moving parts, drift of gas flow from the lookup table should be minimal, if any.

The gas flow controller 100 of FIG. 1 has a sufficient number of observable and controllable parameters to be able to perform self-diagnostics on the flow accuracy as well as on other parameters, such as valve position, pressure transducer drift, etc. Furthermore, these self-diagnostics can take place while the gas flow controller is delivering gas at a desired flow rate to a process chamber.

The controller 120 of FIG. 1 has stored within its computer readable storage medium the values that allow it to determine the required amount of flow restriction opening, h, that is necessary to obtain the desired flow rate for a given gas pressure and temperature. The determination of the required opening can be carried out using a lookup table that is determined ahead of time by measuring the gas flow rate for a wide range of values of pressure, temperature, and valve position, h.

Figure 5:
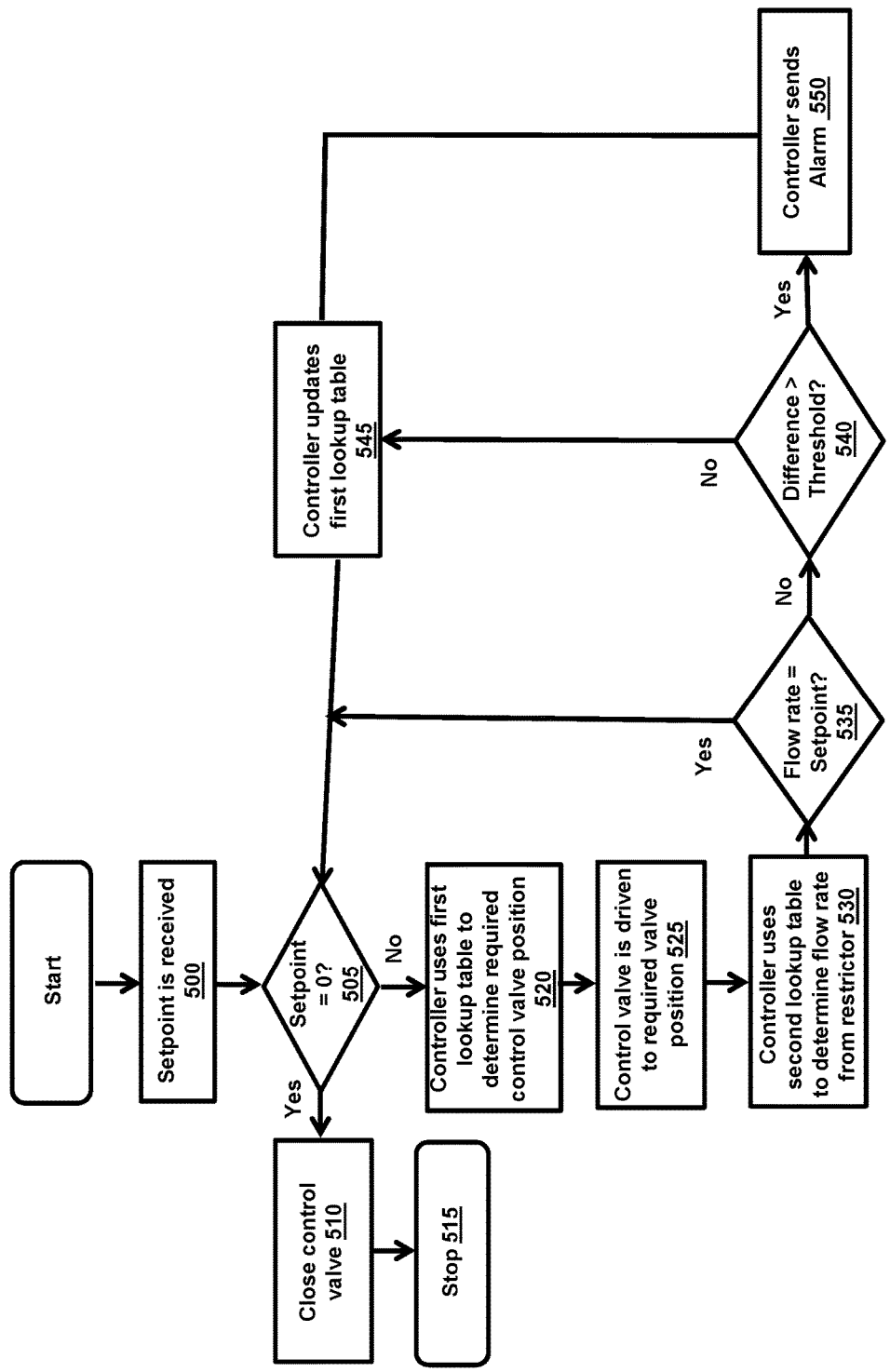
FIG. 5 is a flow chart of an embodiment of a procedure for controlling and verifying the flow of a gas.

One embodiment of a procedure for controlling and verifying the flow of a gas through the gas control valve 108 is shown in the flow chart of FIG. 5, which may be summarized as follows:

1. At step 500 the desired setpoint for flow rate is sent to the controller 120. If at 505 the setpoint is zero, it is assumed that processing is completed and at 510 the controller sends a signal to close the valve and the process stops at 515.
2. If at 505 the setpoint is not zero, the process proceeds to step 520, wherein the controller uses the lookup table for the control valve 108 in conjunction with the measured pressure indicated by pressure transducer, P2 112, to determine the required control valve position from the lookup table.
3. The controller determines the required drive signal to establish the determined position from the first lookup table. This is done using a closed loop control system whereby the drive signal is changed until a position sensor in the control valve determines that the position determined from the first lookup table has been established at 525.
4. The controller reads the values of the pressure transducers, P1 106 and P2 112, and the temperature sensor, T 114. Using this data, the controller determines the flow rate from the second lookup table for the flow restrictor 110.
5. At 535 the controller compares the flow as determined by the flow restrictor second lookup table to the flow as determined by the control valve first lookup table. If at 535 the values match, the process reverts to step 505.
6. If at 535 the flow determined by the flow restrictor second lookup table is different from the flow determined by the control valve first lookup table, then at 540 the controller updates the control valve first lookup table to agree with the flow determined by the flow restrictor second lookup table.
7. In addition, if the comparison of step 540 indicates that the difference between the flow determined by the flow restrictor lookup table and the flow determined by the control valve lookup table is greater than some predetermined threshold, then the controller sends an alarm at 550.
8. Steps 2-7 are repeated at regular intervals during the time that the setpoint is at any nonzero value.

Figure 6:
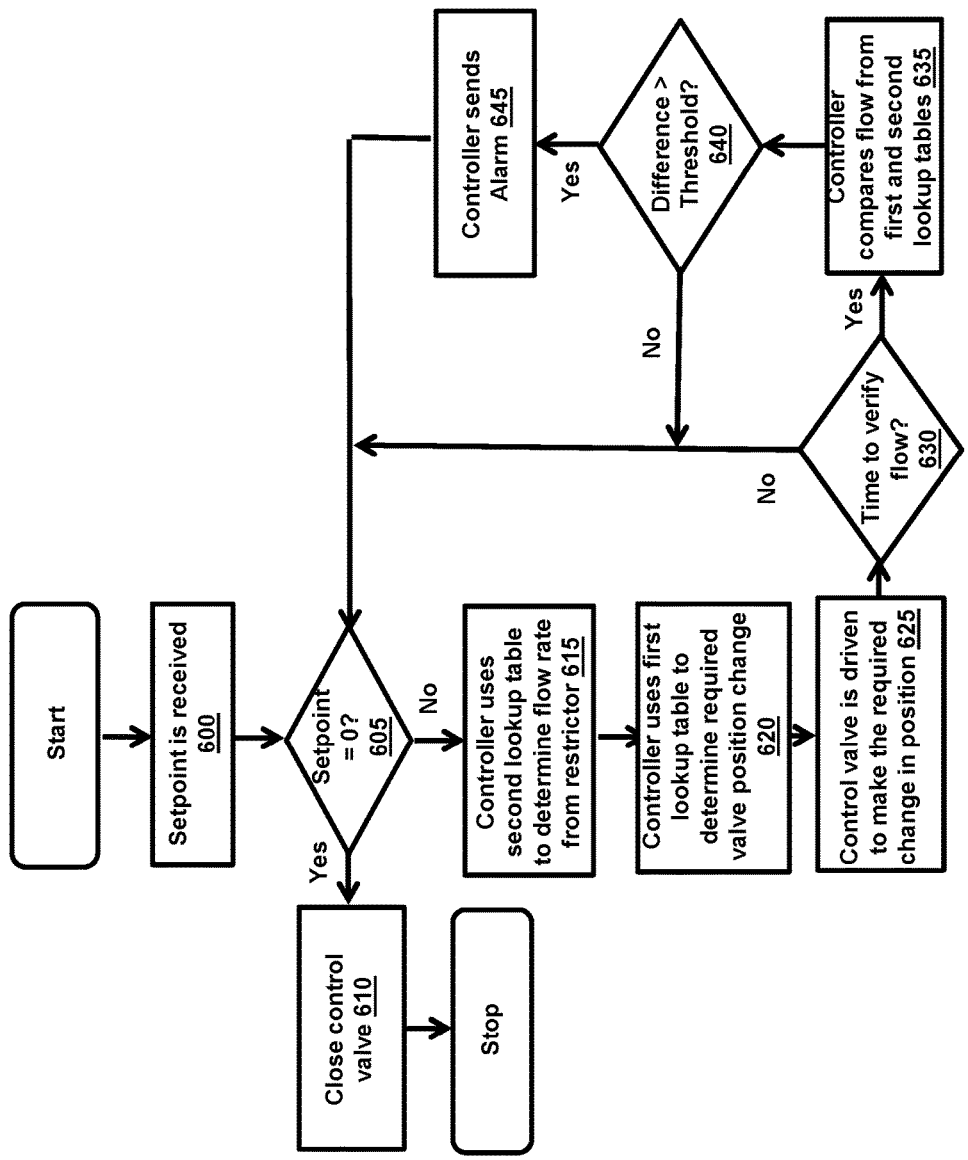
FIG. 6 is a flow chart of another embodiment of a procedure for controlling and verifying the flow of a gas.

In another embodiment, a procedure for controlling and verifying the flow of gas through the control valve 108 is shown in the flow chart of FIG. 6, which may be summarized as follows:
1. A desired setpoint for flow is sent to the controller at 600. If at 605 the setpoint is zero, it is assumed that processing is completed and at 610 the controller sends a signal to close the valve and the process stops.
2. If at 605 the value is not zero, then the controller reads the values of the pressure transducers, P1 and P2, and the temperature sensor, T. Using this data in conjunction with the second lookup table for the flow restrictor, at 615 the controller determines the current flow, which then allows a calculation of how much the flow needs to change to achieve the setpoint flow.
3. At 620 the controller uses the first lookup table for the control valve, and determines how much the valve needs to move to provide the change in flow determined in step 615.
4. The controller commands the control valve to move the required amount at 625.
5. Steps 2, 3, and 4 above are repeated at regular intervals during the time that the setpoint is at any nonzero value.
6. From time to time, either on command or at each change in setpoint or some other convenient schedule, the accuracy of the flow is checked per decision at 630. This is done by at 635 comparing the flow as determined by the flow restrictor lookup table to the flow as determined by the control valve lookup table. If at 640 these two values differ by more than some predetermined threshold, then at 645 a warning or an alarm is sent, alerting the operator that the accuracy of the flow could not be verified.

In this embodiment, the regular interval described in step 5 is chosen to be less than the time that the control valve is able to move to the required position; consequently, the controller is constantly updating the required control valve movement as the control valve ultimately converges to the required position to keep the flow as determined by the lookup table for the flow restrictor equal to the desired setpoint.

Figure 7:
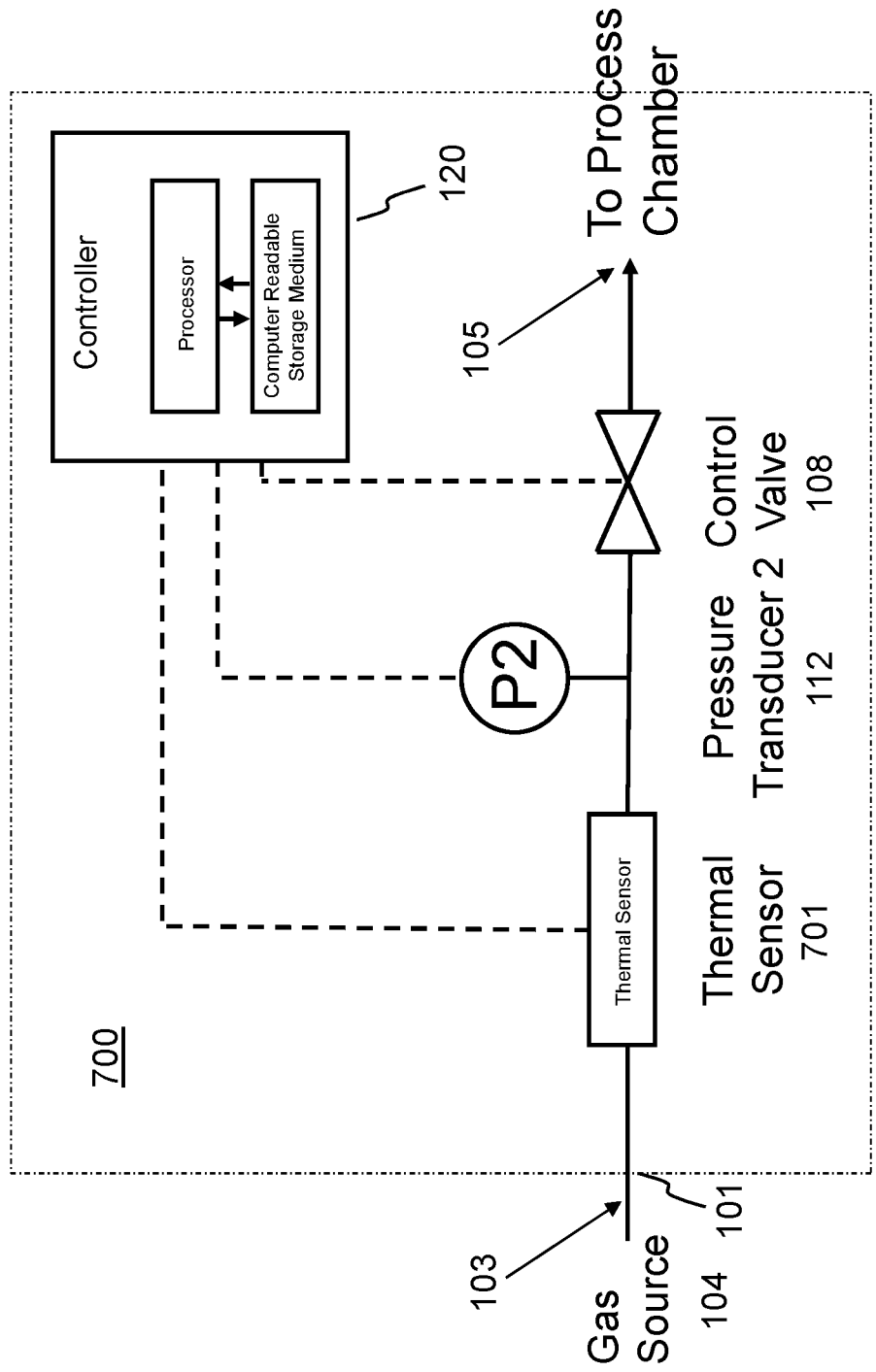
FIG. 7 is a simplified schematic diagram of an embodiment of a gas flow control apparatus in accordance with the present invention for self-verifying gas flow control.

In yet another embodiment, if the required accuracy is not as high, but some type of flow rate verification is desired, then a thermal sensor can be placed upstream of the gas control valve instead of the flow restrictor. This is shown in the drawing of FIG. 7, where the thermal sensor 701 is used to verify the accuracy of the flow rate. In FIG. 7 the temperature differential between the two heating elements as measured by thermal sensor 701 indicates the mass flow rate of the gas. Upstream of GFC 108. This mass flow rate data is used in conjunction with the look-up table of the GFC to verify the actual flow through the GFC and to correct for any drift. As explained in the "Background" section, the inaccuracy in the thermal sensor 701 can be greater than in the flow restrictor; however, the verification of flow rate will provide value in those cases where the control valve fails to operate correctly, since it provides data that can be used to verify drift in the GFC 108. Note that the use of thermal sensor 701 in FIG. 7 is different from its use in the prior art MFC, since in the prior art the thermal sensor output is the indication of flow through the MFC. Conversely, in the embodiment of FIG. 7 the output of the thermal sensor is an indication of flow upstream of the GFC, while the flow through the GFC is determined via the look-up table and is verified by the output of the thermal sensor 701.

What is claimed is:

1. A method of controlling a flow rate of gas through a control valve, the method comprising:
generating a lookup table relating pressure upstream of the gas flow control valve, the measured position of the valve, and flow rates;
establishing a flow rate through the control valve based on the pressure upstream of the gas flow control valve and a required drive signal to obtain a determined position from the lookup table;
continuing to keep the gas flow control valve at the determined position to provide the desired flow rate while measuring the pressure by a pressure transducer positioned upstream of the gas flow control valve;
determining the flow rate through a flow sensor positioned upstream of the pressure transducer, wherein the flow sensor is a flow restrictor with a second lookup table that determines flow rate based on measurements of pressure upstream and downstream of the flow restrictor and the temperature of the flow restrictor;
calculating a discrepancy between the desired flow rate from the lookup table and the flow rate determined by the flow sensor;
updating the lookup table using the discrepancy and continuing to measure the pressure and adjust the gas flow control valve to achieve the desired flow rate, and
sending an alarm if the discrepancy is above a predetermined value.

2. The method of claim 1, wherein the flow restrictor comprises a tube and the method further comprises maintaining pressure upstream of the flow restrictor to at least twice pressure downstream of the flow restrictor.

3. The method of claim 1, wherein the flow restrictor comprises a channel formed in a machined block of metal.

4. A method of controlling a flow rate of gas through a control valve, the method comprising:
a. generating a first lookup table correlating pressure upstream of the gas flow control valve, the measured position of the valve, and flow rates;
b. determining the flow rate of gas through a flow restrictor positioned upstream of the control valve, wherein the gas flow rate is determined by use of a second lookup table and measured values of the pressure upstream of the flow restrictor, the pressure downstream of the flow restrictor, and the temperature of the flow restrictor;
c. determining from the first lookup table the required change in control valve position to obtain the desired flow rate;
d. driving that change in control valve position;
e. repeating steps b d during the time that the desired flow rate is at a nonzero value.

5. An apparatus for controlling the flow of a gas, containing a controllable valve, wherein the position of the valve and the gas pressure upstream of the valve are measured and used in conjunction with a first lookup table to determine the flow rate of the gas through the valve; and a flow restrictor upstream of the controllable valve, wherein the temperature of the flow restrictor and the gas pressure upstream and downstream of the flow restrictor are measured and used in conjunction with a second lookup table to determine the flow rate of the gas through the flow restrictor.

6. The apparatus of claim 5, wherein a comparison of the flow rate as determined from the first lookup table and the flow rate as determined from the second lookup table is used to verify the accuracy of the flow.

7. The apparatus of claim 5, wherein the flow restrictor contains a tube.

8. The apparatus of claim 5, wherein the flow restrictor contains a channel formed in a machined block of metal.

9. An apparatus for controlling the flow of a gas, comprising:
   a control valve;
   a flow restrictor positioned upstream of the controllable valve;
   a first pressure transducer positioned upstream of the flow restrictor;
   a second pressure transducer positioned downstream of the flow restrictor and upstream of the control valve;
   a temperature sensor positioned to measure temperature at the flow restrictor;
   a controller comprising: a processor and a storage medium, the storage medium comprising a first look-up table correlating pressure of the second pressure transducer measured upstream of the gas flow control valve, the measured position of the control valve, and flow rates through the control valve, and a second look-up table correlating upstream pressure of the first pressure transducer, the downstream pressure of the second pressure transducer, temperature of the temperature sensor, and mass flow through the flow restrictor.

* * * * *